Patented Apr. 21, 1925.

1,534,325

UNITED STATES PATENT OFFICE.

LESTER F. HOYT, OF EAST AURORA, NEW YORK, ASSIGNOR TO LARKIN CO. INC., OF BUFFALO, NEW YORK.

LIQUID CONTACT INSECTICIDE.

No Drawing. Application filed January 7, 1924. Serial No. 684,843.

*To all whom it may concern:*

Be it known that I, LESTER F. HOYT, a citizen of the United States, residing at East Aurora, in the county of Erie and State of New York, have invented a new and useful Improvement in Liquid Contact Insecticides, of which the following is a specification.

This invention relates to improvements in insecticides of the kind employing nicotine as the active insect destroying ingredient.

The objects of this invention are to provide an insecticide of this kind which is more efficient in its action than insecticides heretofore made by reason of the fact that the insecticide has greater wetting and spreading properties when sprayed on the surfaces frequented by the insects to be destroyed; also to provide an insecticide of this kind which will operate efficiently even when mixed with hard water; also to improve insecticides of this kind in other respects hereinafter specified.

It is well known that the efficiency of an insecticide of the kind which is sprayed in liquid form upon plants, depends to a large extent upon the surface covered by the liquid, or in other words, upon the spreading power of the liquid. For this purpose I have devised a contact insecticide which may be shipped or sold in concentrated form and diluted with water by the user, and the fundamental constituent of this insecticide is a soap in which the alkaloid nicotine acts as a base and combines with the mixed fatty acids of a vegetable oil. This soap may be made by combining about one part of melted mixed fatty acids of a suitable vegetable oil, such for example as cocoanut oil, with two parts of a 40 per cent solution of free nicotine, or an equivalent amount of any other suitable solution of free nicotine. These materials combine chemically to form a soap or soap-like salt. I have found that the mixed fatty acids of cocoanut oil produce the best results when used in connection with free nicotine but the mixed fatty acids of other vegetable oils may be used with satisfactory results. The resulting soap or soap-like salt is a liquid, readily soluble in a variety of solvents and whose solution in soft water foams freely. This soap contains a high percentage of nicotine and is itself a powerful insecticide and may be used as a spray if diluted with about five hundred parts in water.

I have also found that a still more effective insecticide, and one which can be more easily handled, can be produced by mixing the mixture of the compound of nicotine and vegetable oil fatty acids with a suitable vegetable oil soap, preferably in liquid or jelly form, thus forming a product which contains a large excess of soaps to give the product the necessary wetting and spreading properties. The use of soap in connection with water tends to cause the water to spread more freely over the surface with which it contacts and by using the mixed fatty acids of vegetable oils in making this soap, the resulting soap will not be readily decomposed when used in connection with hard water, so that no particular precaution need be used to employ soft water in using the insecticide. This insecticide is preferably made by first making a liquid soap which, for example, may consist of 36 parts of cocoanut oil, 25 parts of caustic potash of 39° Baumé, 20 parts of denatured alcohol and 9 parts of water. These ingredients when combined form a liquid soap in concentrated state having great wetting or spreading properties, and if 9 parts of this liquid soap are combined with one part of the soap made by combining nicotine with the mixed fatty acids of vegetable oils, the resulting material contains a much larger percentage of coap than the first described compound and consequently if two fluid ounces of this material are mixed with a gallon of water, the resulting liquid will contain sufficient nicotine to act effectively as an insecticide, but a larger percentage of soap than the soap or soap-like salt first described, and consequently the liquid will have a much greater spreading power.

If desired, the insecticide may be put up in jelly or vaseline-like form by changing the proportions of denatured alcohol and water in the formula above indicated. This may be done, for example, by using the same amounts of cocoanut oil and caustic potash indicated in the preceding formula and adding 15 parts of denatured alcohol and 14 parts of water. Nine parts of the soap jelly thus prepared are mixed with one part of the soap made by combining nicotine with the mixed fatty acids of vegetable oils and the soap jelly thus formed is mixed with the same quantity of water, namely two ounces of the soap to a gallon of water, and is used in the same manner as herein described. Cocoanut oil soap and soaps of certain other vegetable oils are not readily decomposed by the ingredients of hard water, and consequently the resulting material can be used with either hard or soft water, as may be desired, without materially diminishing its spreading power when sprayed upon a surface.

If desired, sodium sulphide crystals can be incorporated in the liquid soap composition to increase the effectiveness thereof, and when this is done, the amount of alcohol used may be reduced without reducing the free flowing of the liquid. If eight parts of sodium sulphide crystals are used in the first formula indicated, the amount of alcohol used may be reduced to 11 parts and 10 parts of water are then used.

The insecticide described has greater spreading and wetting properties than other nicotine insecticides heretofore used, which properties are incidental to the greater lathering properties of the soap. Consequently the insecticide described has a greater potential lethal effect due to the greater possibilities of the material wetting the insects, and these properties are produced by forming a soap by the combining of the nicotine chemically with the mixed fatty acids of certain vegetable oils to produce a soap. Hence the nicotine not only retains its full effectiveness as a poison but by forming a part of a soap or soap-like salt, it can more readily reach the insects to be destroyed. In cases where it is desirable to obtain still greater spreading or wetting properties, the additional vegetable oil soap is used and the resulting product can be used equally well with hard water as with soft water, since certain vegetable oil soaps, such as cocoanut oil soap, do not combine readily with the calcium and magnesium salts which are the usual causes of hardness of water. The insecticide described is easy to use since liquid soap or soap of jelly-like consistency can be easily and quickly dissolved in water.

I claim as my invention:

1. An insecticide in concentrated form which is the product formed when free nicotine is chemically combined with the fatty acids of vegeatble oils to form a soap.

2. A contact insecticide in concentrated form which is formed when free nicotine is chemically combined with the fatty acids of cocoanut oil to form a soap or soap-like salt.

3. A contact insecticide consisting of nicotine soap formed by the chemical combination of free nicotine with the mixed fatty acids of a vegetable oil, and soap to increase the spreading power of a solution of the resulting material in water.

4. A contact insecticide consisting of nicotine soap formed by the chemical combination of free nicotine with the mixed fatty acids of a vegetable oil, and a cocoanut oil soap which increases the spreading and wetting power of the insecticide when diluted with water.

5. A contact insecticide consisting of nicotine soap formed by the chemical combination of free nicotine with the mixed fatty acids of cocoanut oil, and a potash-cocoanut oil soap mixed with the resulting nicotine soap, the resulting product being adapted to be mixed with water and sprayed upon the surface to be treated.

6. A liquid contact insecticide consisting of nicotine soap formed by the chemical combination of free nicotine combined with the mixed fatty acids of a vegetable oil, a vegetable oil soap mixed with said nicotine soap, and sodium sulphide.

LESTER F. HOYT.